Figure 1:
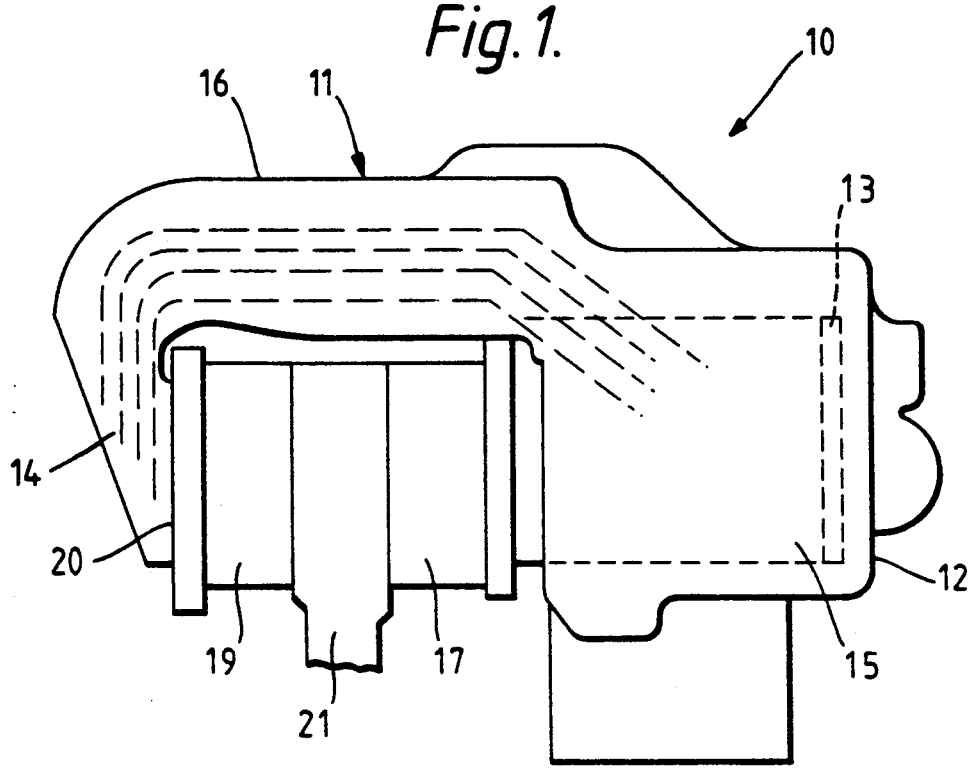

United States Patent [19]

Pantale

[11] Patent Number: 5,234,080
[45] Date of Patent: Aug. 10, 1993

[54] DISC BRAKE

[75] Inventor: David Pantale, Epinay sur Seine, France

[73] Assignee: General Motors France, Gennevilliers, France

[21] Appl. No.: 801,789

[22] Filed: Dec. 4, 1991

[30] Foreign Application Priority Data

Dec. 4, 1990 [GB] United Kingdom ............... 9026297

[51] Int. Cl.⁵ .................... F16D 55/00; B60T 11/00
[52] U.S. Cl. ................... 188/71.1; 188/370; 188/73.31
[58] Field of Search ............... 188/71.1, 72.1, 73.1, 188/73.2, 73.31, 73.35, 73.36, 370

[56] References Cited

U.S. PATENT DOCUMENTS

| | | | |
|---|---|---|---|
| 4,410,070 | 10/1983 | Hagiwara et al. | 188/73.31 |
| 4,705,093 | 11/1987 | Ogino | 188/73.31 |
| 4,749,071 | 6/1988 | Taylor | 188/322.19 |
| 4,775,034 | 10/1988 | Pachner et al. | 188/71.1 |
| 5,022,500 | 6/1991 | Wang | 188/71.1 |
| 5,036,932 | 8/1991 | Schonenberger | 188/71.1 |

FOREIGN PATENT DOCUMENTS

| | | | |
|---|---|---|---|
| 0160433 | 12/1981 | Japan | 188/71.1 |
| 0056632 | 3/1987 | Japan | 188/73.45 |
| 2176725A | 1/1987 | United Kingdom . | |
| 2182989A | 5/1987 | United Kingdom . | |
| 2234023A | 1/1991 | United Kingdom . | |

*Primary Examiner*—Mark T. Le
*Assistant Examiner*—Chris Schwartz
*Attorney, Agent, or Firm*—Ernest E. Helms

[57] ABSTRACT

A disc brake comprises a caliper housing 10 having a body member 12 and an arm member 14 connected to one another by a bridge 16. A leading side of the arm member 14, that is the side which the rotor of a disc brake reaches first during normal rotation thereof, is more rigid than a trailing side thereof. A set of stiffening fibers 28 is provided in each of first and second bridge portions 22, 24 of the bridge 16 to produce the difference is rigidities between the leading and trailing sides of the caliper housing 10, wherein the first bridge portion 22 comprises a greater density of fibers 28 than the second bridge portion 24. This difference in rigidities reduces uneven wear of the brake pad and, as a consequence, reduces brake squeal and noise.

16 Claims, 1 Drawing Sheet

DISC BRAKE

The present invention relates to a disc brake for use in a motor vehicle, and in particular to a brake caliper housing.

It is known in motor vehicles to provide a disc brake assembly which comprises a rotor, inner and outer brake pads, and a caliper housing having a cylindrical recess containing a piston for urging the inner brake pad into braking engagement with one side of the rotor and an arm member for urging the outer brake pad into braking engagement with the other side of the rotor by reactive force on actuation of the piston. The arm member usually comprises two limbs which are substantially identical and symmetrical, and which in use apply the urging force to the outer brake pad to cause it to come into braking engagement with the rotor. This type of disc brake assembly is commonly referred to as the floating caliper type.

In use, it has been found that such an arrangement causes uneven wear of the lining on the brake pad between its leading and trailing sides. This in turn can lead to sticking of the brake pad, and vibration which generates brake squeal or noise.

A prior art disc brake caliper is disclosed in U.S. Pat. No. 5,036,932 in the name of the applicant.

The present invention seeks to provide an improved disc brake.

According to an aspect of the present invention, there is provided a disc brake for a motor vehicle comprising a rotor; inner and outer brake pads disposed on opposite sides of the rotor and movable into braking engagement therewith; a piston for urging the inner brake pad against the rotor; and a caliper housing comprising a body member having a cylinder positioned on one side of the rotor and containing the piston, an arm member positioned on the other side of the rotor and cooperating with the outer brake pad, and a bridge extending between the body member and the arm member across the plane of the rotor, the bridge comprising a plurality of bridge portions each being connected at a first longitudinal extent thereof to the body member and at a second longitudinal extent thereof to the second member and stiffening means operative on one or more of the bridge portions so as to cause the rigidity of the bridge to be stiffer at a leading side of the arm member than at a trailing side thereof. The manner in which the outer brake pad is urged onto the rotor can thereby be altered to prevent or reduce uneven wear thereof.

By 'leading side' of the arm member is meant the side of the arm member which is located upstream with respect to the normal direction of rotation of the rotor (that is the direction in which the rotor rotates when the vehicle is travelling in the forward direction). By 'trailing side' of the arm member is meant the side of the arm member located downstream with respect to the normal direction of rotation of the rotor.

The invention can be used with disc brakes of the fixed, floating and sliding types.

The invention also extends to a disc brake caliper. Advantageously, the stiffening means is embedded in one or more of the bridge portions. In a preferred embodiment, the stiffening means comprises stiffening fibers. The stiffening fibers may extend into the arm member and/or the body member. The stiffening fibers may be made of ceramics or carbon, or of any other suitable material. The caliper housing may be made of steel, aluminium or any other suitable material.

Figure 2:
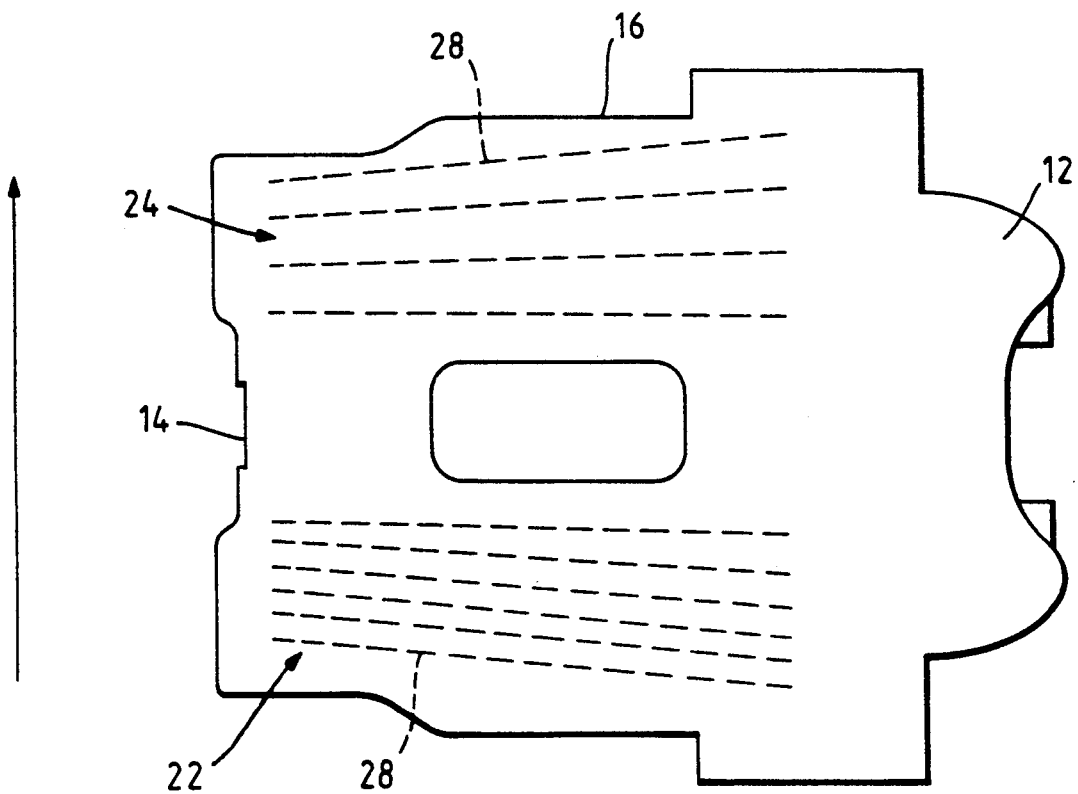

An embodiment of the present invention is described below, by way of illustration only, with reference to the accompanying drawing, in which:

FIG. 1 is a side elevational view of an embodiment of disc brake assembly and brake caliper housing shown from the leading side; and FIG. 2 is a plan view of the brake caliper housing of FIG. 1.

Referring to FIG. 1, the disc brake assembly 10 comprises a brake caliper housing 11 formed of a body member 12, an arm member 14, and a bridge 16 connected at one end to the body member 12 and at the other end to the arm member 14. The body member 12 has a generally cylindrical recess 13 therein which slideably receives a piston 15 to which is pressed an inner brake pad 17. The inner face 20 of the arm member 14 supports an outer brake pad 19 which faces the inner brake pad 17. A brake rotor 21, connected to a wheel (not shown) of a vehicle, lies between the inner and outer brake pads 17, 19.

Hydraulic, or other, actuation of the piston 15 causes the inner brake pad 17 to be urged against one side of the rotor 21 and, by reactive force, causes the caliper housing 11 to float, thereby bringing the outer brake pad 19 into engagement with the other side of the rotor 21, as is well known in the art.

The bridge 16 comprises first and second bridge portions 22, 24 (better seen in FIG. 2) which extend along the longitudinal direction of the bridge 16, and are each connected at a first longitudinal extent to the body member 12 and at a second longitudinal extent to the arm member 14. The two bridge portions 22, 24 are also connected to one another at either end.

A plurality of stiffening fibers 28 are embedded within the caliper housing 11 and extend from within the body member 12, along the bridge 16 into the arm member 14.

As can be seen better in FIG. 2, there are two different sets of fibers, each embedded in a respective bridge portion 22, 24 of the bridge 16. The first set 22 of stiffening fibers is located in the leading side of the caliper housing 11, relative to the direction in which the rotor 21 rotates when the vehicle is travelling forwardly (and shown by the arrow). The second set of stiffening fibers are located in the trailing side of the caliper housing 11.

There is a greater number and density of fibers in the first set of fibers 22 than in the second set 24 to cause the leading side of the caliper housing 11 to be stiffer than the trailing side. It has been found that this reduces uneven wear of the brake pads and, as a consequence, reduces brake noise and wear.

Other arrangements of fibers may be provided to give the same effect, for example, there may be fibers in only the first bridge portion 22, or there may be different types of fibers in the first and second bridge portions 22, 24. Alternatively, the fibers in the first bridge portion 22 may be thicker than the fibers in the second bridge portion.

The fibers may be pre-stressed to increase the overall rigidity of the bridge 16 and of the connection between the bridge and the two members 12, 14. Selective pre-stressing of the fibers can be used to increase the rigidity of the leading side of the bridge relative to the trailing side.

The fibers are conveniently embedded in the caliper housing 11 by placing them in the caliper housing mould prior to casting.

The embodiments of the invention in which an exclusive property or privilege is claimed are defined as follows:

1. A disc brake for a motor vehicle comprising a rotor; inner and outer brake pads disposed on opposite sides of the rotor and movable into braking engagement therewith; a piston for urging the inner brake pad against the rotor; and a caliper housing comprising a body member having a cylinder positioned on one side of the rotor and containing the piston, an arm member positioned on the other side of the rotor and supporting the outer brake pad, and a bridge extending between the body member and the arm member across the plane of the rotor, the bridge comprising a plurality of bridge portions each being connected at a first longitudinal extent thereof to the body member and at a second longitudinal extent thereof to the arm member and stiffening fibers operative in the arm member and at least one of the bridge portions.

2. A disc brake according to claim 1, wherein the stiffening fibers additionally extend into the body member.

3. A disc brake according to claim 1, wherein the fibers are made of ceramics.

4. A disc brake according to claim 1, wherein the fibers are pre-stressed.

5. A disc brake according to claim 1, wherein each bridge portion comprises stiffening fibers, different densities of fibers being provided in each bridge portion.

6. A disc brake according to claim 1, wherein each bridge portion comprises stiffening fibers, the cross-sectional areas of the fibers differing from bridge portion to bridge portion.

7. A disc brake according to claim 1, wherein the bridge comprises two bridge portions.

8. A disc brake according to claim 7, wherein the bridge portions are separated from one another for at least part of the longitudinal extent of the bridge.

9. A disc brake according to claim 1 wherein the fibers are made of carbon.

10. A disc brake for a motor vehicle comprising a rotor; inner and outer brake pads disposed on opposite sides of the rotor and movable into braking engagement therewith; a piston for urging the inner brake pad against the rotor; and a caliper housing comprising a body member having a cylinder positioned on one side of the rotor and containing the piston, an arm member positioned on the other side of the rotor and cooperating with the outer brake pad, and a bridge extending between the body member and the arm member across the plane of the rotor, the bridge comprising a plurality of bridge portions each being connected at a first longitudinal extent thereof to the body member and at a second longitudinal extent thereof to the arm member and embedded stiffening fibers operative on both of the bridge portions extending into the arm member and the body member, wherein there is a greater density of fibers in one bridge portion so as to cause the rigidity of the bridge to be stiffer at a leading edge of the arm member than at a trailing side thereof.

11. A disc brake according to claim 10 wherein the fibers are made of ceramics.

12. A disc brake according to claim 11, wherein the fibers are pre-stressed.

13. A disc brake according to claim 10, wherein each bridge portion comprises stiffening fibers, the cross-sectional areas of the fibers differing from bridge portion to bridge portion.

14. A disc brake according to claim 10, wherein the bridge comprises two bridge portions.

15. A disc brake according to claim 14, wherein the bridge portions are separated from one another for at least part of the longitudinal extent of the bridge.

16. A disc brake according to claim 10, wherein the fibers are made of carbon.

* * * * *